United States Patent
Kumar et al.

(10) Patent No.: US 12,371,759 B2
(45) Date of Patent: Jul. 29, 2025

(54) METAL RECYCLING SYSTEM FOR IN-SPACE MANUFACTURING

(71) Applicant: Microtech Energy LLC, Madison Heights, MI (US)

(72) Inventors: Devendra Kumar, Rochester Hills, MI (US); Satyendra Kumar, Troy, MI (US)

(73) Assignee: Microtech Energy LLC, Madison Heights, MI (US)

( * ) Notice: Subject to any disclaimer, the term of this patent is extended or adjusted under 35 U.S.C. 154(b) by 0 days.

(21) Appl. No.: 17/943,416

(22) Filed: Sep. 13, 2022

(65) Prior Publication Data
US 2023/0088387 A1  Mar. 23, 2023

Related U.S. Application Data

(60) Provisional application No. 63/245,425, filed on Sep. 17, 2021.

(51) Int. Cl.
*C22B 7/00* (2006.01)
*B33Y 40/10* (2020.01)

(52) U.S. Cl.
CPC .............. *C22B 7/004* (2013.01); *B33Y 40/10* (2020.01); *Y02P 10/20* (2015.11)

(58) Field of Classification Search
CPC ........... C21B 7/00; C21B 7/001; C21B 7/004; C22B 9/00; C22B 9/02; C22B 9/23
See application file for complete search history.

(56) References Cited

U.S. PATENT DOCUMENTS

| | | | | |
|---|---|---|---|---|
| 3,374,089 A | * | 3/1968 | Robinson, Jr. | C22C 21/02 75/404 |
| 3,972,514 A | * | 8/1976 | Voitsekhovsky | C22B 9/02 266/120 |
| 4,246,106 A | * | 1/1981 | Dolgov | B01D 29/44 210/791 |
| 2004/0107796 A1 | * | 6/2004 | Kumar | C22B 9/226 75/10.19 |
| 2018/0187285 A1 | * | 7/2018 | Guo | C22B 25/06 |

FOREIGN PATENT DOCUMENTS

| | | | | |
|---|---|---|---|---|
| KR | 101738313 B1 | * | 5/2017 | B22D 13/023 |
| RU | 2680360 C1 | * | 2/2019 | |

OTHER PUBLICATIONS

Printed Circuit Board Shredder, May 8, 2021, Wiscon (Year: 2021).*
Microwave Plasma-Assisted Heat Treating and Joining at Atmospheric Pressure, Oct. 7, 2005, Industrial Heating (Year: 2005).*

* cited by examiner

*Primary Examiner* — Keith D. Hendricks
*Assistant Examiner* — Nikolas Takuya Pullen
(74) *Attorney, Agent, or Firm* — Brooks Kushman P.C.

(57) ABSTRACT

A method for recycling a scrap material includes providing a sample having one or more components having a respective melting temperature, and heating the sample to a first melting point corresponding to a first component to form a molten first component, and separating the molten first component from the sample. A system for recycling scrap materials includes a housing component for a sample containing one or more components to be heated, and subsequently melted and separated. The system may include a microwave plasma source, and at least one collection mechanism corresponding to each separated molten component.

14 Claims, 2 Drawing Sheets

METAL RECYCLING SYSTEM FOR IN-SPACE MANUFACTURING

CROSS-REFERENCE TO RELATED APPLICATIONS

This application claims the benefit of U.S. provisional application Ser. No. 63/245,425, filed Sep. 17, 2021, the disclosure of which is hereby incorporated in its entirety by reference herein.

TECHNICAL FIELD

The present application is directed to systems and methods for separation of metals, and more particularly, separating metals in zero gravity.

BACKGROUND

Generally, the logistical considerations of deep space missions and extra-terrestrial bases include processes such as in-space manufacturing (ISM) and reuse and recycling of materials to ease the planning and enabling longer term space missions. ISM complemented by reuse and recycling of materials is important for both intravehicular (IVA) and extravehicular (EVA) environments. Conventional ISM processes include 3D printing of polymers and metallic materials in microgravity (i.e., $1\times10^{-6}$ g). Similarly, fused filament fabrication (FFF) for thermoplastics has been tested on the International Space Station.

Although conventional methods for recycling have been directed to polymer recycling, these methodologies limit the ability to recycle metals in a microgravity environment. Furthermore, conventional terrestrial methods for metal recycling are difficult to adapt to microgravity environments due to constraints such as space limitations and the non-magnetic nature of many metals and alloys.

SUMMARY

According to one or more embodiments, a method of recycling a scrap material includes providing a sample having one or more components having a respective melting temperature, heating the sample using microwave plasma to a first melting point corresponding to a first component to form a molten first component, separating the molten first component. The separating may be via centrifugal force or via gravity, as based on the environment for the separation. Any number of components may be separated as based on the corresponding melting points, and the temperature reaching the melting point of a particular component via the microwave plasma heating.

DETAILED DESCRIPTION

Figure 1:
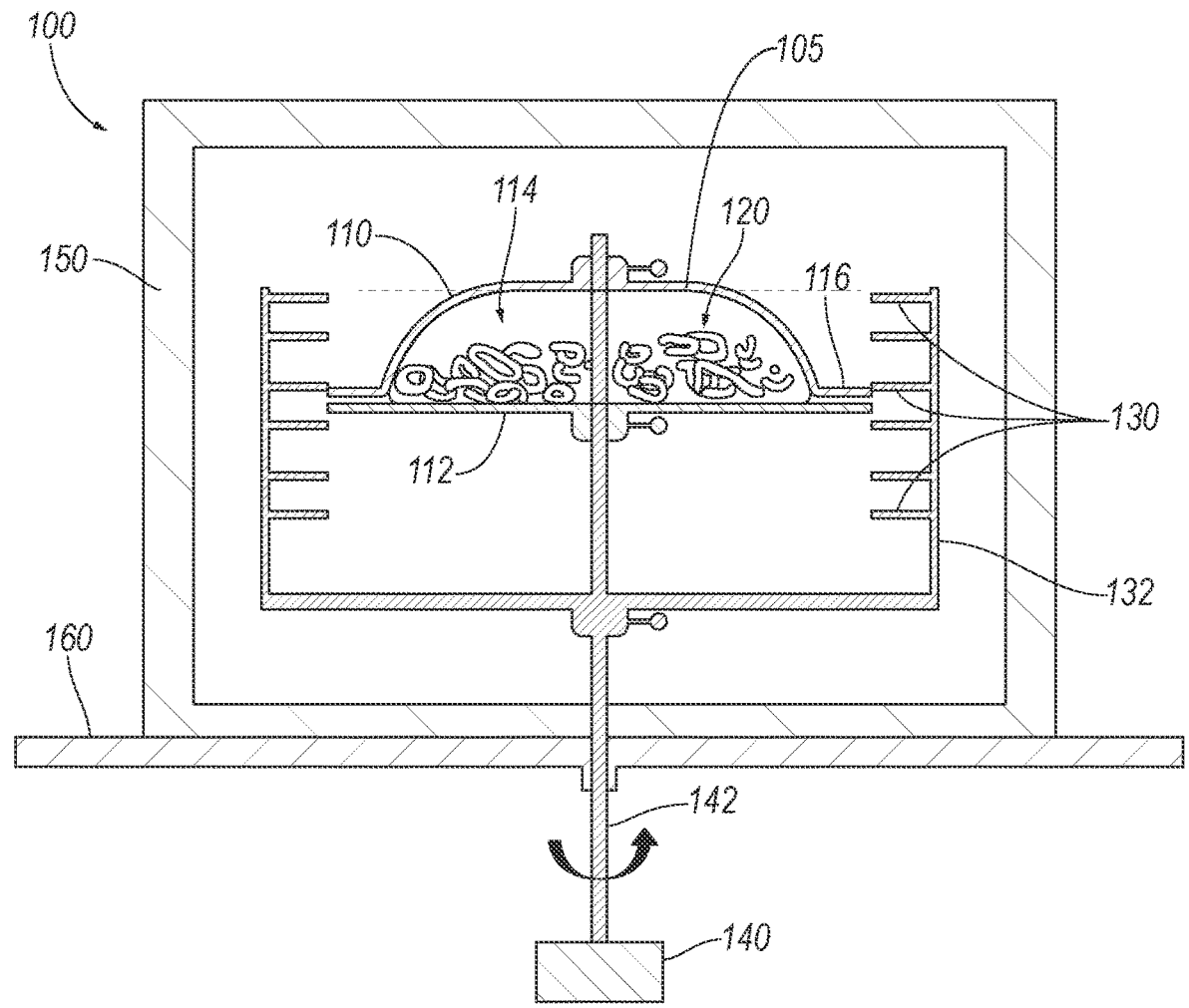
FIG. 1 is a schematic diagram of a metal recycling system, according to an embodiment.

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. The term "substantially," "generally," or "about" may be used herein and may modify a value or relative characteristic disclosed or claimed. In such instances, "substantially," "generally," or "about" may signify that the value or relative characteristic it modifies is within ±0%, 0.1%, 0.5%, 1%, 2%, 3%, 4%, 5% or 10% of the value or relative characteristic. Practice within the numerical limits stated is generally preferred.

It should also be appreciated that integer ranges (e.g., for measurements or dimensions) explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. In the specific examples set forth herein, concentrations, temperature, and reaction conditions (e.g. pressure, pH, flow rates etc.) can be practiced with plus or minus 50 percent of the values indicated rounded to three significant figures. In a refinement, concentrations, temperature, and reaction conditions (e.g., pressure, pH, flow rates, etc.) can be practiced with plus or minus 30 percent of the values indicated rounded to three significant figures of the value provided in the examples. In another refinement, concentrations, temperature, and reaction conditions (e.g., pressure, pH, flow rates, etc.) can be practiced with plus or minus 10 percent of the values indicated rounded to three significant figures of the value provided in the examples.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended aspects, the singular form "a," "an," and "the" comprise plural referents unless the context clearly indicates otherwise. For example, reference to a component in the singular is intended to comprise a plurality of components.

FIG. 1 shows an apparatus that can be used for the separation and recycling of materials, according to one or more embodiments. In an embodiment, the apparatus can be used in a zero or microgravity environment, and in another embodiment, the apparatus can be used on land. Microgravity environments are environments near zero gravity, however where there are still measures of gravity many environments may not be absolutely zero gravity. The scale of microgravity may be based on the acceleration being in the range of $1\times10^{-6}$ of the force of gravity at Earth's surface. In one or more embodiments, as shown in FIG. 1, the apparatus 100 includes a housing 105 configured to receive a sample 120, and a heating source, such as microwave plasma 114, configured to heat the sample 120 to form at least one flowable material component of the sample 120. The housing 105 may include a ceramic dome 110 with a plate 112 for supporting the sample 120. The housing 105 may also have a guide, such as a lip 116, defining a gap between the ceramic dome 110 and the plate 112, that guides the flowable material component into one or more collectors, such as collection rings 130. The housing 105 may be attached to a rotatable shaft 142 such that a centrifugal force may be applied to the sample 120 to separate the flowable material component of the sample 120 by inducing it to exit the chamber defined by the housing 105 via the guide, such that the flowable material component can be collected in the collector.

Figure 2:
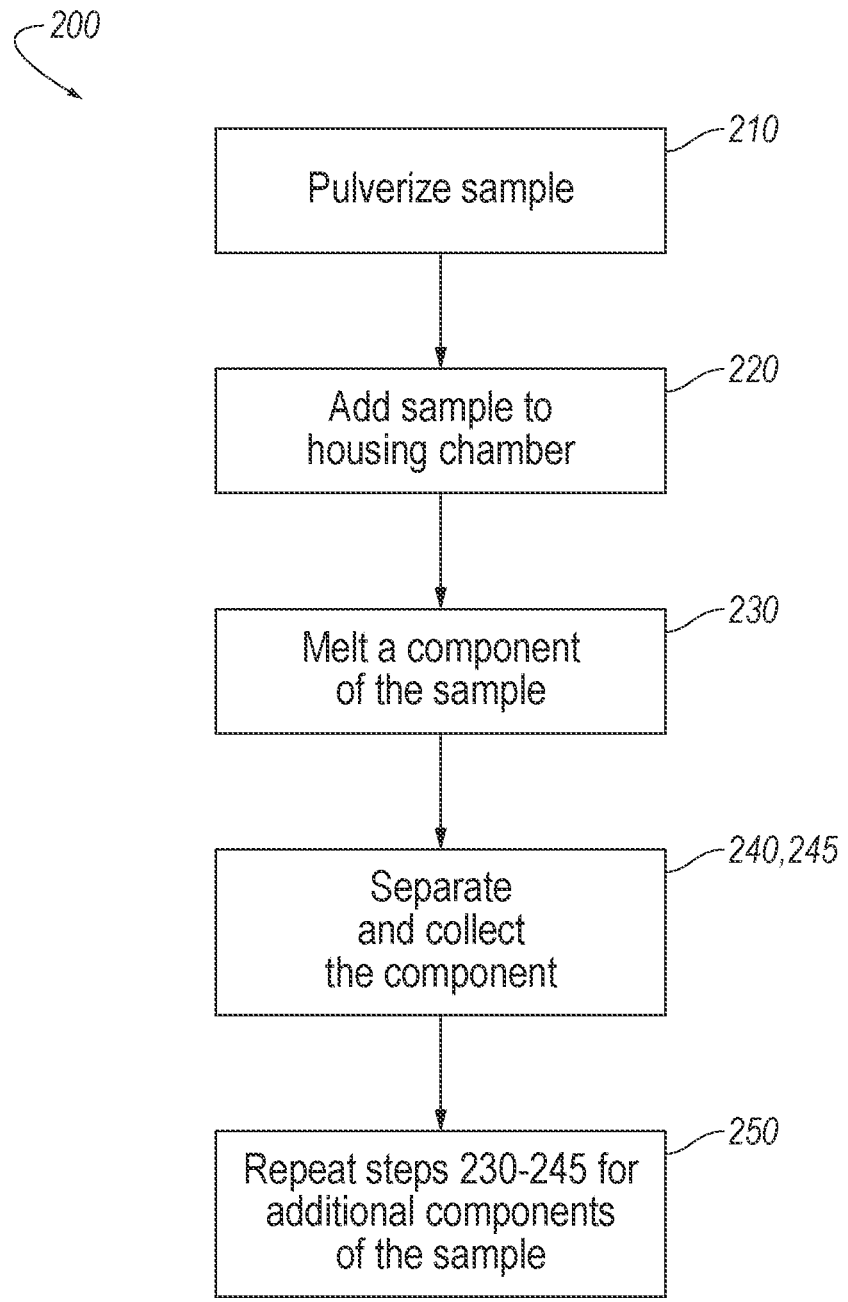
FIG. 2 is a flow chart of a method of metal recycling, according to an embodiment.

FIG. 2 shows a method 200 for separating and/or recycling materials (metals, non-metals, alloys, plastics, etc). In at least one embodiment, the method 200 may work in zero or microgravity conditions (e.g., extravehiclular (EVA)- or intravehicular (IVA) settings in space), as well as on land (i.e., terrestrial applications). The method 200 and system 100 for separating and recycling the metals is based on exploiting the different melting temperatures of different materials that form a single sample 120. This methodology can be especially useful in long space flights in zero or microgravity environments where a spare part may be fabricated using separated and recycled material from one or more broken, damaged, or otherwise scrap parts. The needed spare part can be fabricated by additive manufacturing (such as 3-D printing), after the separated materials are crushed and powdered, such that the separated materials produce raw materials for the additive manufacturing process.

Referring again to FIG. 1, the apparatus 100 is shown as a metal recycling or separating system 100 (hereinafter referred to interchangeably). The metal recycling or separating system 100 is able to recycle metals or alloys, such as, but not limited to, aluminum, stainless steel, titanium and alloys and combinations thereof in both IVA and EVA environments and while also meeting system constraints for processing materials. This system 100 may include atmospheric pressure microwave plasma technology for efficiently heating the metal or alloy to be recycled and/or separated. In certain embodiments, the system 100 may separate scrap metals consisting of aerospace grade metals and alloys by using their different melting temperatures to separate each component individually based on the sequential melting of the components. However, the present method and system may be applicable to all materials, based on the difference in melting temperature of components. As such, although discussed above with respect to certain metals and alloys, the processing sample can be of any material: metal, non-metal (e.g., polymers), ceramic, or even a powder. Furthermore, the system may be used to form raw material of a single component sample (i.e., a pure metal), as the sample can be heated and collected in a flowable form for further processing prior to additive manufacturing. Additionally, the heating rate used in the system 100 may depend on how much microwave power is fed into the plasma 114, and the different melting points for each component to be separated. As such, discussion of a metal or alloy is not intended to be limiting, and the system and/or method may be used to separate any suitable material as desired.

According to one or more embodiments, the scrap composition to be recycled is heated and separated based on the melting points of the material components of the composition. The source of heat may, in certain embodiments, be a microwave generated plasma 114. The microwave generated plasma 114 may be in, for example, argon, or another suitable inert gas, at atmospheric or any other suitable pressure. In one or more embodiments, the plasma 114 is initially ignited by a catalyst, and once ignited, is self-sustaining as the free electrons and ions have a strong coupling with microwave energy. Additionally, in one or more embodiments, the system allows for as much as 95% of the microwave energy to be absorbed into the plasma 114, thereby reducing the potential for energy waste. Because the heat can be, in certain embodiments, generated under atmospheric pressure, a vacuum system is not required, and the air in the processing volume can be flushed out with a suitable gas, such as, but not limited to, argon. Microwave plasma 114 as a heating source provides energy efficiency and improved coupling as the plasma surrounds the target area where heat is needed. Furthermore, microwave plasma 114 as a heating source results in greater uniformity of processing (i.e., uniform heating of the sample). As such, in one or more embodiments, microwave plasma provides high heating rates without being restricted to certain metals or alloys that couple with the microwave field, and are not restricted to parts with complex shapes. In addition, the magnetron provided in the system that produces microwaves need not be in close proximity to the processing volume for easier maintenance and servicing. With proper thermal insulation 150, microwave plasma 114 can produce extremely high temperatures that may be needed to melt certain metals, such as titanium. However, although microwave plasma 114 is described as a heat source for heating the metal to be recycled to separate the metals by their various melting temperatures, the method is not limited to heating by microwave plasma 114 and other heating methods, such as, but not limited to, direct electrical heating, are also contemplated.

Prior to introduction to the system 100, the materials that are to be separated and recycled are crushed into reasonable size pieces (i.e., a sample 120) as based on the chamber size (shown as scrap metal for sample 120 in FIG. 1) and kept on a high-temperature ceramic or other suitable material plate 112. In at least one embodiment, the plate 112 is attached to a shaft 142 that can be rotated by a variable-speed motor 140 to rotate the plate 112 within the housing 105. In some embodiments, the motor 140 may be an electric motor. As shown in FIG. 1, a dome-shaped high-temperature ceramic top 110 (hereinafter, interchangeably, dome 110 or ceramic dome 110) includes a lip 116 at the bottom and is attached to the rotating shaft 142 with a small gap between the bottom of the lip 116 and the plate 112 to form a cavity therebetween for receiving the sample 120 therein. The ceramic dome 110 and the plate 112 form the chamber for the materials (i.e., sample 120) to be separated. The ceramic dome 110 can be mechanically or manually lifted for loading of the sample 120 and also to adjust the gap formed at the lip 116. The ceramic dome 110 is transparent to the microwaves (i.e., microwave permeable), and the shape of the ceramic dome 110 limits the ability of the solid scrap material to escape the chamber from the gap between the lip 116 and the plate 112 when the shaft 142 is rotating. As such, when molten material is melted from the sample 120 and the shaft 142 is rotating, the lip 116 guides the molten metal into collection rings 130.

This inner cavity defined by the dome 110 has collection rings 130 in the housing 105 outside of the dome 110. In certain embodiments, the collection rings 130 define generally circular and concave receptacles and surround the dome 110. During the melting process, portions of the system 100 rotate as the sample 120 heats. For example, in at least some embodiments, one or more of the dome 110, the plate 112 and the collection rings 130 are rotatable. Shown in FIG. 1 are three circular molten metal collection rings 130 that are attached to a support arm 132 structure that is also rotatable by the shaft 142. Although three rings 130 are shown in the embodiment depicted in FIG. 1, and in some embodiments, depending upon the number of different materials to be separated for recycling, the number of collection rings 130 could be more or less, and the depiction of three rings is not intended to be limiting. Moreover, although rings 130 are shown for collection, any shaped collection plates may be used that allow for collection of molten material via the lip 116 based on rotation of the parts of the system 100. The melting temperatures of the collection rings 130 as well as the support arm 132 structure is higher than the melting temperatures of the components of the sample 120 to be separated for recycling, such that the rings 130 maintain their structural integrity during processing of the scrap materials.

In one or more embodiments, the collection rings 130 or the support arm 132 may be attached to a lift that allows vertical movement of the collection rings 130 either individually or collectively, such that as temperature varies within the chamber and different components are melted into molten form for collection, each component can be separately collected on a different ring. The collection rings 130 may be mechanically moved by an automated process (e.g., based on temperature) or by manual input. As such, the collection rings 130 can be moved based on the specific component being collected in one of the collection rings 130 being molten for collection. In other embodiments, the collection rings 130 can be manually moved in a non-automated process upon observation of a specific component being molten for collection. Furthermore, in certain embodiments, the collection rings 130 are kept in rotation while the metals are in molten state, for example, via a motor which may be in some embodiments, separate from the motor 140 driving rotation of the ceramic plate 112, or in other embodiments, coupled to the motor 140 driving rotation of the ceramic plate 112. In other embodiments, the shaft 142 for the ceramic plate 112 and dome 110 may vertically move to align the lip 116 with various collection rings 130, as opposed to the collection rings 130 being movable. In non-zero-gravity environments, e.g., on land, the vertical position of the system components may remain stationary, and an additional way for separation could be used, such as gravity instead of rotation, as different components of the sample 120 reach molten state, and the depiction of a centrifugal collection method is not intended to be limiting. For example, in a gravity-based separation system, the molten material may be drained from the plate 112 based on openings in the plate 112 via gravity, with each molten material from the sample 120 being separately collected based on the different melting temperatures of each component. Furthermore, although not shown, the system may further operate under a vacuum such that the sample to be recycled can be melted at each temperature in sequence to allow for separation of each component via centrifugal motion as described for the microgravity environment. For example, the cavity may be vacated of gas such that the system operates under vacuum, and the plasma is generated within the vacuum to heat the sample for separation via rotation of the plate in the vacuum. As such, generally, the plasma 114 allows for precision heating to promote each molten component to be separated before the next component melts for separation.

The ceramic plate 112 along with the dome 110, collection rings 130, and the support arm 132 may be enclosed in a thermal insulation 150 in the housing 105 that is kept on the base plate 160. This thermal insulation 150 may also be transparent to the microwaves, such that a magnetron source may be external to the thermal insulation 150. As shown in FIG. 1, the shaft 142 is rotated by a motor 140, such as an electric motor, mounted under the base plate 160, which allows for rotation to force movement of the molten scrap component out of the chamber via the gap and into the collection rings 130, as in a centrifuge.

It may be noted that the shapes of the thermal insulation 150, ceramic plate 112, the dome 110, and the collection rings 130 can be readily changed without affecting the separation. The need for rotation facilitates separation in zero or microgravity environment. For operation on land, the shaft 142 may be kept vertically stationary, and an additional way for separation could be used, such as gravity instead of rotation. For example, as previously described for draining, a perforated ceramic plate 112 with different collection discs underneath could be used for collection of different metals/materials at different temperatures via gravity, and discussion of centrifuge style collection is not intended to be limiting.

According to one or more embodiments, the metal recycling system 100 described herein may provide a clean recycling system 100 such that little to no pollution is created, as the heating source is microwave plasma 114 in a suitable gas environment (e.g., argon), and the motors, such as a piezoelectric transducer (PZT), or other suitable motor, do not require bearing lubrication. A small and/or negligible amount of adsorbed gases on the surface of the scrap metal may be released during heating which can be trapped by any suitable means in the system 100, thus maintaining a clean recycling system 100 with little to no pollution. In other words, the proposed system 100 may not generate any pollution. In a refinement, the system 100 may be scaled up and/or automated with various components, and depiction of a particular embodiment is not intended to be limiting.

Moreover, the metal recycling system 100 provides a flexible method of processing the metals. The system 100 is designed to handle and process a variety of parts made from combinations of metals and/or alloys. Generally, scrap metal which comes out of shredder contains multiple metals/alloys and may be frequently processed by the metal recycling system 100. Any parts for recycling that contain just one metal can still be processed by the recycling system 100, but will be simpler than scrap metals containing combinations of metals and/or alloys, as no separation will be required for recycling.

In addition, the metal recycling system 100 processes the parts to be recycled at atmospheric pressure. Because the process used to heat the parts is at atmospheric pressure, no vacuum pump or associated equipment is needed, and as such, a smaller size system 100 can be produced.

Also, the metal recycling system 100 provides an efficient separation technique with generally low power requirements, as compared with conventional metal recycling techniques. The system 100 is designed to keep separated metals/alloys stored at different locations to prevent mixing. For example, in at least one embodiment, the power requirement for the metal recycling system 100 is about 2 to 3 kW of power. The power requirement is sufficient for melting and separation of the metals in a container dome 110 (e.g., having a diameter of about 3 to 5 inches), as shown in FIG. 1.

Generally, the metal recycling system 100 described herein is scalable for larger part processing and the method may also be compatible with current processing systems. The metal recycling system 100 is a versatile system that can be designed for IVA and can be scaled up for EVA environments and can supply feedstock for current in-space manufacturing (ISM) processes. Moreover, the metal recycling system 100 described herein can be automated and remotely controlled to optimize processing of the metal parts to be recycled.

Furthermore, a pulverizing technique such as a shredder may be included and may be used in an EVA environment. For examples, a small compact shredder can be designed for an IVA environment. Moreover, the flexibility of the process allows any metals/alloys to be separated, not just aluminum, stainless steel and titanium. For example, by entering different values indicative of melting temperatures into the software to structure the heating routine and make the collection rings 130 mechanically move at the new temperatures numerous components of a sample may be separated. The same process can also be extended to separate more than three different metals by adding additional collection rings 130.

Although not shown, the system 100 may include other components, including, but not limited to gas inlet and outlet lines (e.g., for argon supply), a metallic enclosure under the base plate 160 that shields the electric motor from microwaves, if necessary, a mechanism that adjusts the height of the collection rings 130 so that a particular collection ring aligns with the gap between the ceramic plate 112 and the bottom of the lip 116 in the dome 110, so as to collect the molten metal/material that is coming out at a particular temperature, and a quartz or a ceramic bell jar that sits on, and seals with the base plate 160 and completely encloses the thermal insulation 150. This can be used to remove air by a pump, if necessary, and backfill the processing volume by argon or some other suitable gas. Furthermore, for plasma generation, although not shown, a catalyst may be used to ignite the plasma 114 in the gas when the microwave is turned on, and a thermocouple or other temperature measurement device(s) e.g., an optical pyrometer may be incorporated to measure temperature inside the chamber. Additionally, the system 100 may include, although not shown, a metallic chamber/box that encloses all items, with the microwaves being fed into this chamber via a waveguide or by mounting the magnetron on the box itself. In certain embodiments, the inside of the metallic box may contain a microwave mode mixer to minimize the hot spots, and one or more microwave chokes to prevent arcing between two metallic components that are in close proximity.

According to one or more embodiments, with reference to FIG. 2, a method 200 of separating metals for recycling is described. The method will be herein described via an illustrative example, which is not intended to be limiting to types or number of metals or corresponding system components. As an illustrative example, the scrap metal consistent of three different types of metals/materials X, Y and Z with their melting temperatures T1, T2 and T3 respectively, in the increasing order of magnitude. The scrap material/metal may be pulverized (i.e., step 210) such as by shredding to produce the scrap sample that is added to the dome-plate housing (i.e., step 220). After filling the dome 110 with argon (or other suitable gas), the microwaves are turned on to ignite the plasma 114. The scrap materials start getting heated (i.e., step 230) at a rate controlled by the microwave power. The first (e.g., lowest) collection ring is initially aligned with the gap between the ceramic plate 112 and the bottom of the lip 116 in the dome 110. As the temperature approaches T1 the metal X is separated (i.e., step 240) such as by rotating the shaft 142 via the motor 140 at a suitable RPM so as to throw out the molten metal X by the centrifugal force. The molten metal X is collected in the first (e.g., lowest) collection ring (i.e., step 245). After some additional time when the temperature approaches T2 the second collection ring is lined up to collect the molten metal Y, and so on for the third metal Z. The shaft 142 continues to rotate until all metals are separated in their respective collection rings 130 (i.e., step 250) and cooled down to solidify after the microwave plasma 114 is turned off.

For example, the system 100 and/or method 200 described above, may be used to separate and/or recycle one or more metals/alloys. For example, the metals/alloys may be aerospace grade metals, such as, but not limited to, aluminum, stainless steel and titanium. The metals can be separated by taking advantage of their different melting temperatures (e.g., approximately 660° C. for aluminum, 1450° C. for stainless steel and 1650° C. for titanium). As such, separation by melting in the proposed system and method combines two steps of recycling i.e., separation and then melting, into one. The samples may be any suitable size for processing as based on the chamber size and parts needing recycling, and the system and/or method may further include a shredder for preparing the sample for processing.

Generally, the atmospheric pressure microwave plasma 114 is provided in a high-temperature ceramic cavity (i.e., a ceramic cavity rated to sustain its integrity in the temperatures reached by the microwave plasma 114), as described above with respect to FIG. 1, is used to heat a sample 120 containing one or more metals within the cavity. The examples described herein may be described using an argon plasma 114, and a sample 120 containing aluminum, stainless steel, and titanium, however the discussion of specific heating source, specific gas and metals is not intended to be limiting, and the process may be used with other heating sources, gases for plasma, as well as other materials for recycling that have varying melting temperatures. As such, an argon plasma 114, ignited and sustained by the microwave field inside the ceramic dome 110, surrounds the metallic pieces and initiates rapid heating of the sample, and is not intended to be a limiting example.

As temperature approaches the first melting temperature, or interchangeably, first threshold temperature (e.g., 660° C.) corresponding to a first melting point (related to a first component of the sample) and the system components rotate, a first component (e.g., aluminum) of the sample is melted into a molten metal, and rotation allows the molten metal to be guided out of cavity and into one of the collection rings 130. As the temperature further increases inside the cavity (i.e., via microwave plasma heating), the second collecting ring replaces the first one, either by mechanical, automated, or manual replacement, or movement of the cavity. As temperature reaches the second metal melting point, or interchangeably second threshold temperature (e.g., 1450° C.) corresponding to a second melting point (related to a second component (e.g., stainless steel) of the sample), the molten second component is guided out of the cavity and is collected in the second collection ring. The same process continues for the third metal component (and for any subsequent components) which is collected in the third collection ring when the temperature reaches the third melting temperature, or interchangeably, third threshold temperature, corresponding to a third melting point (related to a third component of the sample (e.g., 1650° C. and/or a temperature exceeding 1650° C.). The collection rings 130 continue to rotate in zero gravity environment until the temperature cools to below the melting point of the lowest melting point component (e.g., 660° C.) to keep the molten metal confined in the collection ring. Although three metals are described in this example, any number of metals, melting temperatures, and collection rings 130 may be used as based on the desired separation or type of component being separated. For example, this technique may be used to recycle a single component scrap material, or may be used for any alloy having two or more components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for recycling scrap materials comprising:
   a housing defining a chamber configured to receive a sample containing at least a first component and a second component therein, the housing having a guide to allow flow out from the chamber, the guide defined between a protruding lip of a microwave permeable dome and a plate supporting the sample thereon;
   a microwave plasma source configured to generate microwave plasma within the chamber to heat the sample via microwaves provided by an external magnetron source through the microwave permeable dome; and
   a first collector corresponding to the first component of the sample and a second collector corresponding to the second component of the sample, the second collector being disposed along a vertical axis and spaced apart from the first collector, and the first and second collectors being positioned external to the chamber such that a respective collector of the first and second collectors is vertically movable to horizontally align an opening of the respective collector around the guide to collect a respective component of the first and second components,
   wherein one of the housing and the respective collector is movable in a vertical direction such that the guide is aligned with the respective collector based on the corresponding respective component to be collected, and wherein the microwave plasma heats the sample to a first threshold temperature corresponding to a first melting point of the first component to form a molten first component, and wherein the molten first component is separable from the sample and collectable in the first collector via flow of the molten first component out of the chamber through the guide and into the first collector when the first collector is vertically aligned with the guide, and the first collector is capable of being rotated such that molten first component remains confined in the first collector due to centrifugal force until the first molten component cools to below the first threshold temperature.

2. The system of claim 1, further comprising gas inlet and outlet lines configured to supply and evacuate gas to and from the chamber, respectively.

3. The system of claim 1, wherein the first and second collectors are mounted on a support arm which is vertically oriented such that the first and second collectors are disposed along the vertical axis and vertically aligned along the support arm, and the housing is rotated via a motor to move the first component toward the guide using centrifugal force.

4. The system of claim 1, further comprising a motor that cooperates with the housing via a shaft to rotate the housing to separate the first component of the sample.

5. The system of claim 4, wherein a support arm including the first and second collectors mounted and disposed vertically thereon and which is vertically oriented along the vertical axis is movable in a vertical direction to position the opening of the respective collector in alignment around the guide to collect the respective component.

6. The system of claim 1, further comprising a metallic housing that encloses the system.

7. The system of claim 6, wherein the metallic housing is configured to be within a zero or microgravity environment.

8. The system of claim 1, further comprising a shredder to reduce sizes of pieces of the sample.

9. A system for recycling scrap materials comprising:
   a housing defining a chamber configured to receive a sample containing at least a first component and a second component therein, the housing having a guide to allow flow out from the chamber, the guide defined between a protruding lip of a microwave permeable dome and a plate supporting the sample thereon;
   a heating source including a microwave plasma source configured to generate microwave plasma within the chamber to heat the sample; and
   a support arm structure including a first collector corresponding to a first component of the sample, and a second collector corresponding to a second component of the sample and disposed along a vertical axis spaced apart from the first collector such that the that the first collector and the second collector are rotatable and moveable in the vertical direction relative to the chamber to position one of the first collector and the second collector in vertical alignment with the guide to collect the respective component, the support arm structure and first and second collectors being positioned outside the chamber,
   wherein the heating source is configured to heat the sample to a first threshold temperature corresponding to a first melting point of the first respective component to form a molten first component and heat the sample to a second threshold temperature corresponding to a second melting point of the second respective component to form a molten second component, and wherein the molten first component is separable from the sample and collectable in the first collector via flow of the molten first component out of the chamber through the guide and into the first collector when the first collector is vertically moved to be aligned with the guide and the molten second component is separable from the sample and collectable in the second collector via flow of the molten second component out of the chamber through the guide and into the second collector when the second collector is vertically moved to be aligned with the guide, and the first and second collectors are capable of being rotated such that each respective molten component remains confined in the respective collector due to centrifugal force.

10. The system of claim 9, further comprising a metallic housing that encloses the housing, heating source, and the at least one collector.

11. The system of claim 9, further comprising gas inlet and outlet lines configured to supply and evacuate gas to and from the chamber, respectively.

12. The system of claim 9, wherein the support arm is movable in the vertical direction to position one of the first and second collectors in alignment with the guide, and the housing is rotatable to move the molten first component toward the guide using centrifugal force.

13. The system of claim 12, further comprising a motor that cooperates with the housing via a shaft to rotate the housing to collect the first component of the sample at the respective collector.

14. The system of claim 9, wherein the first collector is capable of being rotated until the first molten component cools to below the first threshold temperature, and the second collector is rotated until the second molten component cools to below the second threshold temperature.

\* \* \* \* \*